UNITED STATES PATENT OFFICE.

CONRAD SCHRAUBE, OF LUDWIGSHAFEN, GERMANY, ASSIGNOR TO THE BADISCHE ANILIN AND SODA FABRIK, OF SAME PLACE.

YELLOW DYE.

SPECIFICATION forming part of Letters Patent No. 644,333, dated February 27, 1900.

Application filed December 16, 1897. Serial No. 662,186. (Specimens.)

*To all whom it may concern:*

Be it known that I, CONRAD SCHRAUBE, doctor of philosophy, a subject of the King of Prussia, Emperor of Germany, residing at Ludwigshafen-on-the-Rhine, in the Kingdom of Bavaria and Empire of Germany, have invented new and useful Improvements in the Manufacture of New Coloring-Matter Derived from Peri-Hydroxy-Phenanthronaphthazine, (for which patents were obtained in Germany February 11, 1896, No. 90,212; in England July 18, 1896, No. 15,953, and in France July 27, 1896, No. 258,395,) of which the following is a specification.

I have discovered that by the treatment of phenanthrene quinone either with peri-hydroxy-ortho-diamido-naphthalene and subsequent treatment with sulfuric acid or with sulfo-acids of peri-hydroxy-ortho-diamido-naphthalene new dyestuffs are obtained which derive from peri-hydroxy-phenanthro-naphthazin, &c., and which are suitable for dyeing very fast yellow shades on wool and silk.

It will be observed that in each form in which it is produced my new dyestuff is a sulfo-acid; but I do not wish to limit myself to the order in which the sulfo group is introduced, whether introduced as a part of the phenanthrene-quinone body or as a part of the peri-hydroxy-ortho-diamido-naphthalene body, or as a part of both, or whether introduced after the combination of any of said bodies. Nor do I limit myself to the presence of only a single sulfo group, since it may either be accompanied by another when introduced or have others added to it.

The generic characteristics by which may be recognized any member of the series of dyestuffs produced according to this invention are: solubility in water with a yellow color, solubility in nitric acid of 40° Baumé with a red color, and capacity to dye wool and silk yellow shades.

The following examples will serve to illustrate the manner in which my invention can best be carried into practical effect. The parts are by weight:

*Example 1.—The manufacture of a dyestuff by condensing phenanthrene-quinone with the 1.2-diamido-8-naphthol and subsequently sulfonating the obtained product.—* The 1-2-diamido-8-naphthol, which serves for the production of peri-oxy-phen-anthro-naphthazin, is obtained by the reduction of sulfanilic acid-azo-2-amido-8-naphthol, which latter has been prepared by combining diazo-sulfanilic acid with 2-amido-8-naphthol in an acetic-acid solution. Reduce about thirty-seven parts of the sodium salt of the azo-dye-stuff in the known way in a neutral or weakly acetic acid solution of one per cent. with zinc-dust. The 1-2-diamido-8-naphthol so obtained is not separated, as it is unstable, but the solution of it filtrated from the zinc-dust is directly employed. Add it (weakly acid with acetic acid) to a solution of twenty parts of phenanthrene-quinone in one hundred parts of sodium bisulfite 40° Baumé and one thousand parts of water, and warm it to 90° centigrade. Heat to about 90° to 95° centigrade, and the product of condensation will be separated. Take a test, filter it, heat it during a longer time, and the reaction is finished, when there is no more separating. Separate the peri-oxy-phenanthro-naphthazin so obtained from the mother liquor by filtration, wash, dry, and purify it by boiling with alcohol. It is nearly insoluble in the usual solvents. With concentrated sulfuric acid it gives a greenish-blue solution. Stir the oxy-phenanthro-naphthazin into five parts of cold-fuming sulfuric acid of twenty-three per cent. free anhydride until a test dissolves in diluted soda-lye, and a sulfo-acid will be obtained, difficultly soluble even in hot water, which dyes wool in a rather dull-yellow shade. With five parts of fuming sulfuric acid of twenty-three per cent. free anhydride at a temperature of 40° centigrade a sulfo-acid is obtained which is already soluble in cold water. The sodium salt of it is also very easily soluble and can be precipitated out of the solution by the means of common salt. It also dyes a dull yellow.

*Example 2—Production of a dyestuff by condensing phenanthrene-quinone with di-amido-naphthol-sulfoacids.—*Suspend the azo-dyestuff prepared in an acid solution of diazo-sulfanilic acid and 2-amido-8-naphthol-6-sulfoacid with about twenty times its weight of hot water and add hydrochloric acid and stannous chlorid until the liquid is decolored. After cooling separate the crystals from the mother liquor and wash well with dilute hydrochloric acid. The so-obtained 1-2-diamido-8-naphthol-6-sulfoacid is difficultly soluble in water. This acid as well as the diamido-naphthol-sulfoacids mentioned below are especially characterized by their being able to condense with phenanthrene-quinone to yellow dyestuffs, which are very fast to alkali. The condensation is made as follows: Mix about four hundred and two parts of paste of phenanthrene-quinone of five per cent. with two hundred and sixty parts of a paste of 1.2-diamido-8-naphthol-6-sulfoacid of ten per cent., add about three hundred and fifty parts of water, and warm it at a temperature of 90° to 95° centigrade until the phenanthrene-quinone disappears, and a test of the mixture is clearly soluble in hot water with a yellow color. Then precipitate the condensed product with common salt and separate it from the mother liquid by filtering. The yellow dyestuff so obtained is crystalline and very difficultly soluble in water. It is practicable to employ it in the form of a paste; also, the sodium salt is only little soluble in water. In concentrated sulfuric acid the dyestuff dissolves with a greenish-blue color. When in this example the said diamido-naphthol-sulfoacid is substituted by the 1.2-diamido-8-naphthol-4-monosulfoacid or the 1.2-diamido-8-naphthol-5-monosulfoacid, sulfoacids are obtained, also difficultly soluble in cold water; but when in this manufacture the equivalent quantity of 1.2-diamido-8-naphthol-5-7-disulfoacid or the 1.2-diamido-8-naphthol-3.6-disulfoacid is employed easier-soluble sulfoacids are obtained, with a purer-yellow shade. The coloring-matter obtained from 1.2-diamido-8-naphthol-5-7-disulfoacid occurs as a yellow paste or powder and dissolves in water with a pure-yellow color. The aqueous solution gives a yellow precipitate on adding caustic soda, which dissolves with a reddish-yellow color on heating. The dry dyestuff dissolves in nitric acid of 40° Baumé with a red and in sulfuric acid of 66° Baumé with a blue-violet color. These diamido-naphthol-sulfoacids are best prepared by reducing the azo-dyestuffs of the corresponding amido-naphthol-sulfoacids. Thus the 1.2-diamido-8-naphthol-4-monosulfoacid is prepared by reducing the azo-dyestuffs which are obtained by combining diazo-compounds with 1.8-amido-naphthol-4-monosulfoacid in acid solution, the 1.2-diamido-8-naphthol-5-monosulfoacid by reducing an azo-dyestuff prepared from 1.8-amido-naphthol-5-monosulfoacid in acid solution, the 1.2-diamido-8-naphthol-3.6-disulfoacid by reducing an azo-dyestuff prepared from 1.8-amido-naphthol-3.6-disulfoacid in acid solution, and the 1.2-diamido-8-naphthol-5-disulfoacid by reducing an azo dyestuff of the 1.8-amido-naphthol-5.7-disulfoacid. The said diamido-naphthol sulfoacids are obtained in a crystalline form by the reduction with hydrochloric acid and stannous chlorid.

*Example 3—Production of a dyestuff by condensing phenanthrene-quinone di-sulfo-acid with 1.2-diamido-8-naphthol.*—Twenty (20) parts phenanthrene-quinone are warmed to 80° to 100° centigrade with eighty (80) parts fuming sulfuric acid (twenty-three (23) per cent. free anhydride) until a test portion dissolves easily and clear in cold water. Treat, as is customary, with lime and convert the lime salt into sodium salt. Dissolve and dilute to about five hundred (500) parts and acidify with acetic acid. Now add to this solution an acetic-acid solution of 1.2-diamido-8-naphthol, which has been obtained from the coloring-matter, sulfanilic acid-azo-2.8.amidonaphthol, which has been prepared in an acetic-acid solution. Now heat during two hours to a temperature of 90° to 100° centigrade. Filter boiling, and from the filtrate salt out the coloring-matter. Filter, press, and dry. The coloring-matter is easily soluble in pure water with a brownish-yellow color. It dissolves in weakly-alkaline water with reddish-yellow color. More caustic soda produces brownish-yellow precipitate of coloring-matter. With concentrated sulfuric acid it gives a blue-green color and dissolves in nitric acid of 40° Baumé with a red color. It dyes wool yellow.

*Example 4—Production of a dyestuff by condensing phenanthrene-quinone disulfoacid and 1.2-diamido-8-naphthol-4-sulfoacid.*—Proceed as in Example 3, substituting for the there-mentioned 1.2-diamido-8-naphthol the equivalent amount of 1.2-diamido-8-naphthol-4-sulfoacid, which can be obtained by reducing the azo coloring-matter obtained by combining diazotized sulfanilic acid with 1.8-amido-naphthol-4-sulfoacid in hydrochloric-acid solution by suitable reduction—as, for example, by means of zinc-dust. The coloring-matter is easily soluble in pure water, giving a brownish-yellow solution. It also dissolves in slightly-alkaline water, giving a reddish-yellow solution; but the addition of more alkali causes a brownish-yellow precipitate of the coloring-matter. It gives with concentrated sulfuric acid a blue-green color and with nitric-acid of 40° Baumé a reddish color. It dyes wool a sad-reddish yellow.

I herein use the term "phenanthro-quinone body" to include both sulfonated and unsulfonated phenanthrene-quinone and the term "perihydroxy-ortho-diamido-naphthalene body" to include both the unsulfonated peri-hydroxy-ortho-diamido-naphthalene and the sulfonated peri-hydroxy-ortho-diamido-naphthalene.

What I claim as new, and desire to secure by Letters Patent, is—

1. As a new article of manufacture sulfonated peri-hydroxy-phenanthronaphthazin which dissolves in water with a yellow color, in nitric acid of 40° Baumé with a red color and which dyes silk and wool yellow shades substantially as described.

2. As a new article of manufacture the sulfonated peri-hydroxy phenanthronaphthazin bodies which can be obtained by treating phenanthrenquinone with peri-hydroxy-ortho-diamido-naphthalene-sulfoacid and which dissolve in water with a yellow color, the aqueous solution gives a yellow precipitate on adding caustic soda, which dissolves with a reddish-yellow color on heating, and the dry dyestuff dissolves in nitric acid of 40° Baumé with a red color, and in sulfuric acid of 66° Baumé with a blue-violet color, substantially as described.

3. As a new article of manufacture the dyestuff which can be obtained by the treatment of phenanthrenquinone with 1.2-diamido-8-naphthol-5.7-disulfoacid, and which dissolves in water with a pure-yellow color, the aqueous solution gives a yellow precipitate on adding caustic soda, which dissolves with a reddish-yellow color on heating, and the dry dyestuff dissolves in nitric acid of 40° Baumé with a red color and in sulfuric acid of 66° Baumé with a blue-violet color, substantially as described.

In testimony whereof I have hereunto set my hand in the presence of two subscribing witnesses.

CONRAD SCHRAUBE.

Witnesses:
 GUSTAV L. LICHTENBERGER,
 BERNHARD C. HESSE.